(12) United States Patent
Miyamoto et al.

(10) Patent No.: US 9,938,091 B2
(45) Date of Patent: Apr. 10, 2018

(54) CONVEYING METHOD AND CONVEYING DEVICE OF RUBBER MEMBER

(71) Applicant: TOYO TIRE & RUBBER CO., LTD., Osaka-shi, Osaka (JP)

(72) Inventors: Ryoshi Miyamoto, Osaka (JP); Yoshiki Hashimoto, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 512 days.

(21) Appl. No.: 14/612,437

(22) Filed: Feb. 3, 2015

(65) Prior Publication Data

US 2015/0290813 A1     Oct. 15, 2015

(30) Foreign Application Priority Data

Apr. 15, 2014 (JP) ................................ 2014-083615

(51) Int. Cl.
| | |
|---|---|
| *B25J 11/00* | (2006.01) |
| *B65G 47/91* | (2006.01) |
| *B29D 30/48* | (2006.01) |

(52) U.S. Cl.
CPC .............. *B65G 47/91* (2013.01); *B29D 30/48* (2013.01); *B29D 2030/482* (2013.01)

(58) Field of Classification Search
CPC ... B65G 47/91; B29D 30/48; B29D 2030/482
See application file for complete search history.

(56) References Cited

U.S. PATENT DOCUMENTS

2014/0262048 A1     9/2014   Miyamoto et al.

FOREIGN PATENT DOCUMENTS

| CN | 104057558 A | | 9/2014 | |
| CN | 104057588 A | * | 9/2014 | ............ B29D 30/26 |
| JP | 8-118515 A | | 5/1996 | |
| JP | 10-291261 A | | 11/1998 | |

OTHER PUBLICATIONS

Office Action dated Dec. 21, 2016, issued in counterpart Chinese Application No. 201410710723.0, with English translation (14 pages).

* cited by examiner

*Primary Examiner* — Michael S Lowe
(74) *Attorney, Agent, or Firm* — Westerman, Hattori, Daniels & Adrian, LLP

(57) ABSTRACT

In a conveying method of a rubber member for receiving the rubber member which is supplied from a supply device and is curved, and transferring the received rubber member to a supply receiving device in a curved state, the method includes a step of winding the rubber member from a leading end portion onto a mounting surface of a rotary table by forwardly rotating the rotary table and receiving the rubber member from the supply device in a state in which a rear end portion of the rubber member is not in contact with the mounting surface, a step of moving the rotary table from a receiving position to a transferring position, and a step of winding back the rubber member from the rear end portion so as to transfer the rubber member to the supply receiving device by reversely rotating the rotary table.

6 Claims, 6 Drawing Sheets

CONVEYING METHOD AND CONVEYING DEVICE OF RUBBER MEMBER

BACKGROUND OF THE INVENTION

Field of the Invention

The present invention relates to a conveying method and a conveying device of a rubber member for receiving the rubber member which is supplied from a supply device and is curved, and transferring the received rubber member to a supply receiving device in a curved state.

Description of the Related Art

In manufacturing of a pneumatic tire, there has been frequently employed a method which linearly extrudes a bead filler having a predetermined cross sectional shape and winds the bead filler to an outer peripheral side of a bead wire so as to bond end portions at the time of molding the bead filler having an annular shape (for example, Patent Document 1). However, since tensile force is generated due to difference between inner and outer circumferences of the bead filler at the time of winding around the bead wire, there have been problems that the outer peripheral portion bends or becomes thinner, the bonded portion peels or a surplus cut rubber is generated.

In order to solve the problems, Patent Document 2 is structured such that internal stress is reduced by spirally winding a linearly extruded bead filler and cooling the wound bead filler by cooling water. However, since the bead filler is cooled while being wound between two drums which are arranged side by side in the Patent Document 2, the bead filler is extended between two drums.

Therefore, at the time of molding the annular bead filler, it is preferable to employ a method which annularly molds a bead filler extruded from an extruding device in a state in which the bead filler is curved so as to have a desired curvature, while keeping the curvature, in place of a method which annularly curves a bead filler extruded linearly from the extruding device. However, it has been hard to convey the bead filler which is curved and extruded to a molding machine while keeping the curvature.

PRIOR ART DOCUMENTS

Patent Documents

Patent Document 1: JP-A-10-291261
Patent Document 2: JP-A-8-118515

SUMMARY OF THE INVENTION

Accordingly, an object of the present invention is to provide a conveying method and a conveying device of a rubber member which can convey the rubber member which is supplied from a supply device and is curved, to a supply receiving device while keeping a curvature.

The object mentioned above can be achieved by the following present invention.

More specifically, the conveying method of a rubber member according to the present invention is a conveying method of a rubber member for receiving the rubber member which is supplied from a supply device and is curved, and transferring the received rubber member to a supply receiving device in a curved state, the method including the steps of:

winding the rubber member from a leading end portion onto a mounting surface of a rotary table by forwardly rotating the rotary table and receiving the rubber member from the supply device in a state in which a rear end portion of the rubber member is not in contact with the mounting surface;

moving the rotary table from a receiving position to a transferring position; and winding back the rubber member from the rear end portion so as to transfer the rubber member to the supply receiving device by reversely rotating the rotary table.

Since the conveying method of a rubber member according to the present invention winds up the curved rubber member supplied from the supply device onto the mounting surface of the rotary table by forwardly rotating the rotary table, it is possible to receive the curved rubber member from the supply device while keeping the curvature of the curved rubber member. Since the rubber member received from the supply device is moved from the receiving position to the transferring position together with the rotary table, it is possible to convey the rubber member received from the supply device to the supply receiving device in the curved state. Since the rubber member on the mounting surface is wound back so as to be transferred to the supply receiving device by reversely rotating the rotary table at the transferring position, it is possible to transfer the curved rubber member to the supply receiving device while keeping the curvature thereof. Further, since it is possible to smoothly transfer the rubber member by receiving the rubber member in a state in which the rear end portion of the rubber member is not in contact with the mounting surface at the time of receiving the rubber member from the supply device, and transferring the rubber member from the rear end portion of the rubber member to the supply receiving device at the time of transferring the rubber member to the supply receiving device, it is possible to appropriately keep the curvature of the rubber member. As a result, according to the conveying method of a rubber member of the present invention, it is possible to convey the rubber member which is supplied from the supply device and is curved to the supply receiving device while keeping the curvature of the rubber member.

In the conveying method of a rubber member according to the present invention, it is preferable to make the rear end portion not in contact with the mounting surface by sucking the rear end portion by a first suction pad which outwardly protrudes out of the mounting surface, in the receiving step, and to release the rear end portion by cancelling the suction by the first suction pad in the transferring step.

According to the structure, it is possible to make the rear end portion of the rubber member not in contact with the mounting surface while securely retaining the rear end portion at the time of receiving the rubber member, and it is possible to easily transfer the rear end portion of the rubber member to the supply receiving device at the time of transferring the rubber member.

In the conveying method of a rubber member according to the present invention, it is preferable to retract and accommodate the first suction pad in the rotary table, in the transferring step.

According to the structure, it is possible to prevent the first suction pad from interfering with the supply receiving device at the time of transferring the rubber member to the supply receiving device.

The object mentioned above can be achieved by the following present invention.

More specifically, the conveying device of a rubber member according to the present invention is a conveying device of a rubber member for receiving the rubber member which is supplied from a supply device and is curved, and transferring the received rubber member to a supply receiving device in a curved state, the device including:

a rotary table having a mounting surface on which the rubber member can be mounted;

a first suction pad which can suck the rubber member by protruding outward from the mounting surface;

a moving mechanism which can move the rotary table between a receiving position and a transferring position; and a control device controlling the first suction pad so as to receive the rubber member in a state in which a rear end portion of the rubber member is not in contact with the mounting surface by sucking the rear end portion of the rubber member by the first suction pad at the receiving position, and transfer the rubber member by cancelling the suction by the first suction pad so as to release the rear end portion at the transferring position.

Since the conveying device of a rubber member according to the present invention is provided with the rotary table having the mounting surface on which the rubber member can be mounted, and the rubber member which is supplied from the supply device and is curved, onto the mounting surface by forwardly rotating the rotary table, it is possible to receive the curved rubber member from the supply device while keeping the curvature of the rubber member. Further, the conveying device is provided with the moving mechanism which can move the rotary table between the receiving position and the transferring position, and it is possible to convey the rubber member which is received from the supply device, to the supply receiving device in the curved state. It is possible to transfer the curved rubber member to the supply receiving device while keeping the curvature of the rubber member, by reversely rotating the rotary table at the transferring position so as to rewind the rubber member on the mounting surface. Further, since it is possible to smoothly transfer the rubber member by receiving the rubber member in a state in which the rear end portion of the rubber member wound up onto the mounting surface is not in contact with the mounting surface by sucking the rear end portion by the first suction pad, at the time of receiving the rubber member from the supply device, and transferring the rubber member from the rear end portion of the rubber member to the supply receiving device by cancelling the suction by the first suction pad, at the time of transferring the rubber member to the supply receiving device, it is possible to appropriately keep the curvature of the rubber member. As a result, according to the conveying device of a rubber member of the present invention, it is possible to convey the rubber member which is supplied from the supply device and is curved to the supply receiving device while keeping the curvature of the rubber member.

In the conveying device of a rubber member according to the present invention, it is preferable that the first suction pad can be displaced between a protruding position at which the first suction pad protrudes out of the mounting surface, and a retraction position at which the first suction pad is retracted from the protruding position.

According to the structure, it is possible to prevent the first suction pad from interfering with the supply receiving device at the time of transferring the rubber member to the supply receiving device.

In the conveying device of a rubber member according to the present invention, the rotary table is preferably provided with a second suction pad arranged at a position which is different in a circumferential direction from the first suction pad on the mounting surface.

According to the structure, it is possible to prevent the rubber member from being deviated from a place on the mounting surface by sucking the rubber member by the second suction pad. Further, for example, even in the case that the mounting surface of the rotary table is stood in a vertical direction at the time of transferring the rubber member to the supply receiving device, the rubber member can be prevented from being away from the mounting surface by sucking the rubber member by the second suction pad.

DETAILED DESCRIPTION OF THE PREFERRED EMBODIMENTS

Figure 1:
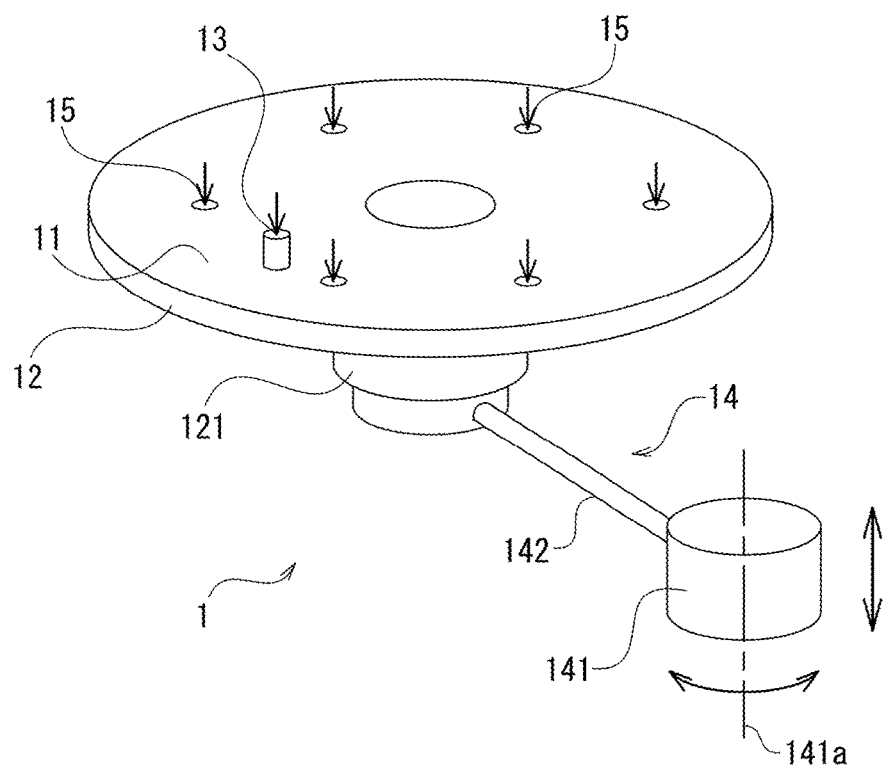
FIG. 1 is a perspective view showing a conveying device of a rubber member according to the present invention.

A description will be given of embodiments according to the present invention with reference to the accompanying drawings. FIG. 1 is a perspective view showing a general structure of a conveying device of a rubber member. A conveying device 1 of the present invention is provided for receiving the rubber member which is supplied from a supply device and is curved, and transferring the received rubber member to a supply receiving device in a curved state.

The shape of the rubber member is not particularly limited, however, the conveying device according to the present invention is useful for conveying a rubber member which has a cross sectional shape having small thickness and large width and is curved in a width direction. In the present embodiment, there is shown a rubber member which is extruded out of an extruding device in a curved state, for molding an annular bead filler formed into an approximately triangular shape in cross section that is long in a radial direction.

The conveying device 1 is provided with a rotary table 12 having a mounting surface 11 on which a rubber member can be mounted, a first suction pad 13 which can suck the rubber member by protruding outward from the mounting surface 11, and a moving mechanism 14 which can move the rotary table 12 between a receiving position and a transferring position.

Figure 2:
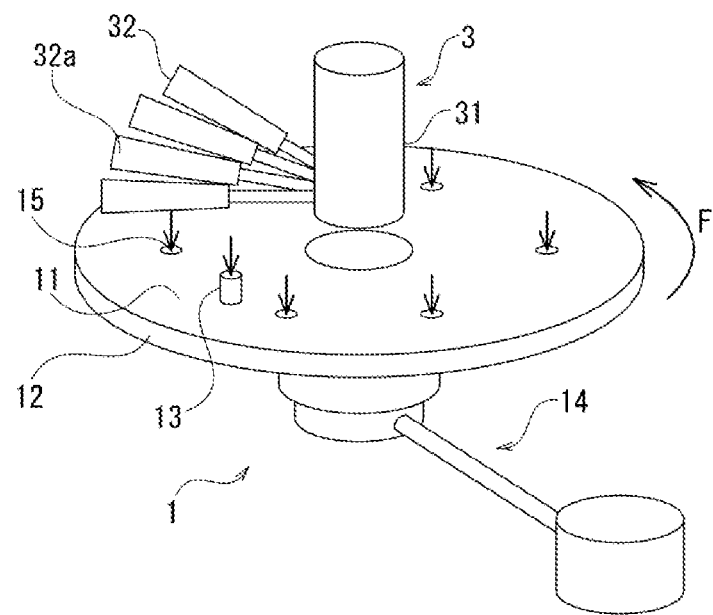
FIG. 2 is a view showing a state in which a rotary table is at a receiving position.
Figure 3:
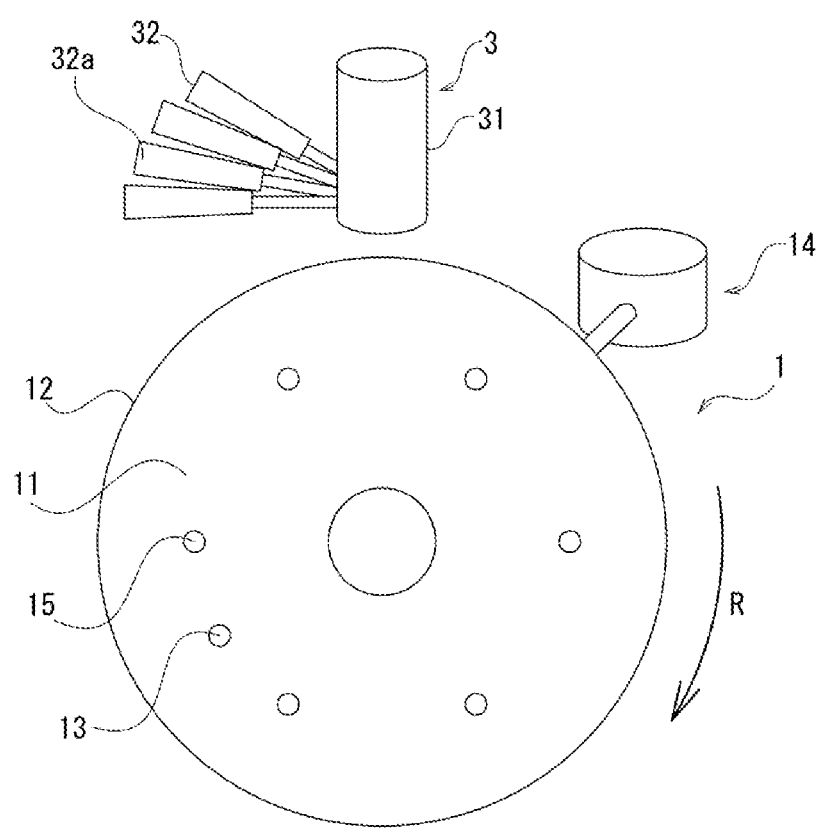
FIG. 3 is a view showing a state in which the rotary table is at a transferring position.

In the present invention, a position of the rotary table 12 at the time of receiving the rubber member from the supply device is called a receiving position, and a position of the rotary table 12 at the time of transferring the rubber member to the supply receiving device is called a transferring position. FIG. 2 shows a state in which the rotary table 12 is positioned at the receiving position, and FIG. 3 shows a state in which the rotary table 12 is positioned at the transferring position. In this case, FIG. 3 does not show the supply receiving device.

The rotary table 12 according to the present embodiment is formed into a discoid shape. The rotary table 12 is not necessarily formed into the discoid shape. A rotary shaft 121 is concentrically connected to a bottom surface of the rotary table 12. The rotary table 12 can rotate in a forward direction and a reverse direction at any rotating speed around the rotary shaft 121.

An upper surface of the rotary table 12 forms a mounting surface 11, and the curved rubber member can be mounted on the mounting surface 11 while keeping its curvature. In the present embodiment, the mounting surface 11 is shown as the annular mounting surface, however, the mounting surface 11 may be formed into a discoid shape.

The first suction pad 13 is provided so as to protrude outward from the mounting surface 11. In this case, it is preferable that the first suction pad 13 can be displaced between a protruding position shown in FIG. 1, and a retraction position at which the first suction pad is retracted from the protruding position. The first suction pad 13 at the retraction position is positioned below the mounting surface 11 and is accommodated in the rotary table 12.

A leading end of the first suction pad 13 forms a suction surface, and is structured to be changeable between a suction state and a suction cancelled state in relation to the rubber member, by air intake and discharge by means of an air intake and discharge means such as a vacuum pump (not shown).

It is preferable that a second suction pad 15 is provided in the rotary table 12 at a position which is different in a circumferential direction from the first suction pad 13 on the mounting surface 11. In the present embodiment, 6 second suction pads 15 are provided approximately at uniform intervals in the circumferential direction. A leading end of the second suction pad 15 forms a suction surface in the same manner as in the first suction pad 13.

The moving mechanism 14 is provided with an oscillation mechanism 141 which can oscillate the rotary table 12 within a horizontal surface, and an elevation mechanism which can move up and down the oscillation mechanism 141 in a vertical direction. A support shaft 142 connected to a bottom surface side of the rotary table 12 is fixed to the oscillation mechanism 141, and the support shaft 142 can be oscillated within a horizontal surface around an oscillation axis 141a extending in the vertical direction. The elevation mechanism can move the oscillation mechanism 141 in the vertical direction together with the support shaft 142. Further, the support shaft 142 can rotate around its own axial direction. A motor (not shown) is used for driving each component in the moving mechanism 14.

As shown in FIG. 2, the rotary table 12 can wind up and receive the rubber member which is supplied from the supply device and is curved, onto the mounting surface 11, by forwardly rotating in a direction of F at the receiving position. As a result, the conveying device 1 can receive the curved rubber member from the supply device while keeping the curvature of the rubber member.

In the present embodiment, a roller conveyor 3 constructed by a plurality of rollers which rotate while supporting a lower surface of the curved rubber member is shown as an example of the supply device.

The roller conveyor 3 is provided with a column support 31 which is suspended from the above, and a plurality of conveying rollers 32 which are arranged side by side spirally around the column support 31 so as to construct a spiral conveying surface, and rotate and convey the rubber member while supporting the lower surface of the rubber member. Here, the conveying surface spirally extends from above to below so as to surround the periphery around the column support 31, and can spirally convey the rubber member from above to below. The plurality of conveying rollers 32 are sequentially arranged at positions which are shifted little by little in the circumferential direction from above toward below, and lined-up roller surfaces 32a construct a spiral conveying surface. In FIGS. 2 and 3, only a part of the plurality of conveying rollers 32 is shown.

The conveying device 1 can transfer the rubber member received from the roller conveyor 3 in the curved state to the supply receiving device. The rotary table 12 is moved from the receiving position in FIG. 2 to the transferring position in FIG. 3 by the moving mechanism 14. As shown in FIG. 3, the rotary table 12 comes to a posture in which the mounting surface 11 is directed to the horizontal direction and stands in the vertical direction, at the transferring position.

As shown in FIG. 3, the rotary table 12 can transfer the rubber member to the supply receiving device by reversely rotating in a direction of R at the transferring position and winding back the rubber member on the mounting surface 11. As a result, the conveying device 1 can transfer the curved rubber member to the supply receiving device while keeping the curvature of the rubber member.

Figure 4:
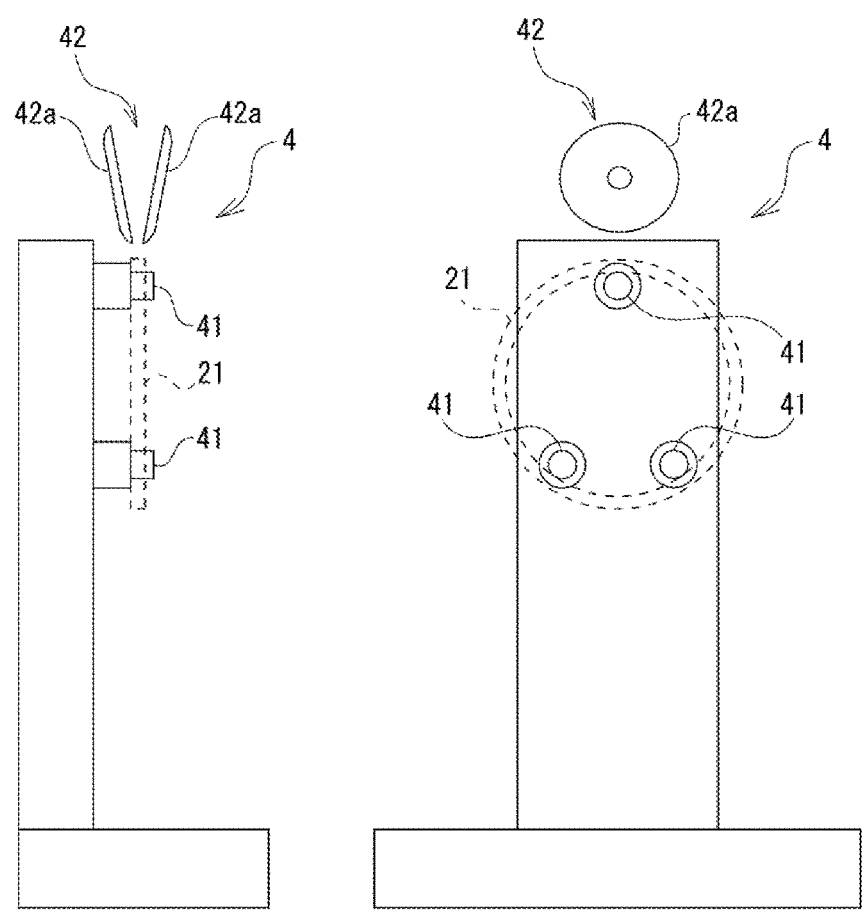
FIG. 4 is a side elevational view and a front elevational view showing a whole of a molding machine.

In the present embodiment, a molding machine 4 is shown as an example of the supply receiving device. FIG. 4 is a side elevational view and a front elevational view of the molding machine 4. The molding machine 4 is provided with 3 wire set rollers 41 which can retain an annular bead wire 21 (shown by a broken line in FIG. 4) from an inner peripheral side. Each of the wire set rollers 41 can rotate, and it is possible to rotate the bead wire 21 in a circumferential direction by simultaneously rotating the 3 wire set rollers 41. Further, a crimp stitcher 42 is provided above the wire set rollers 41. The crimp stitcher 42 is constructed by a pair of stitcher rollers 42a, can apply force directed to the bead wire 21 to the rubber member by passing the rubber member between the pair of stitcher rollers 42a, and can crimp the rubber member onto the bead wire 21.

Further, the conveying device 1 is provided with a control device (not shown), and the control device can control each of motions such as rotation of the rotary table 12, suction and elevation of the first suction pad 13, drive of the moving mechanism 14, and suction by the second suction pad 15. Detailed control by the control device will be mentioned later.

A description will be given below of a conveying method of a rubber member according to the present invention. The conveying method of a rubber member according to the present invention is provided for receiving the rubber member which is supplied form the supply device and is curved, and transferring the received rubber member to the supply receiving device in the curved state.

The conveying method of a rubber member is provided at least with a step of receiving the rubber member from the supply device, a step of moving the received rubber member from the receiving position to the transferring position, and a step of transferring the rubber member to the supply receiving device.

Figure 5A:
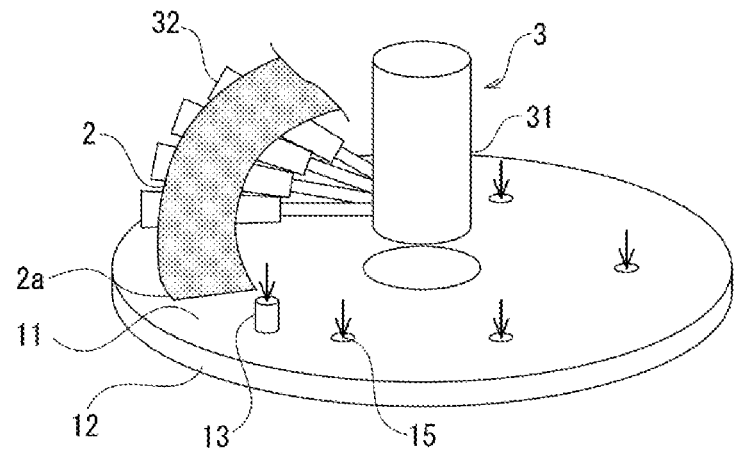
FIGS. 5A to 5C are views showing states in which the conveying device receives the rubber member from a supply device.
Figure 5B:
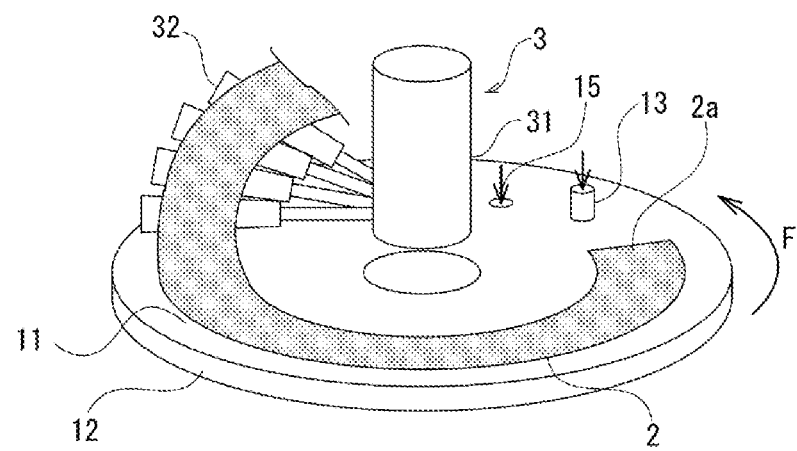
Figure 5C:
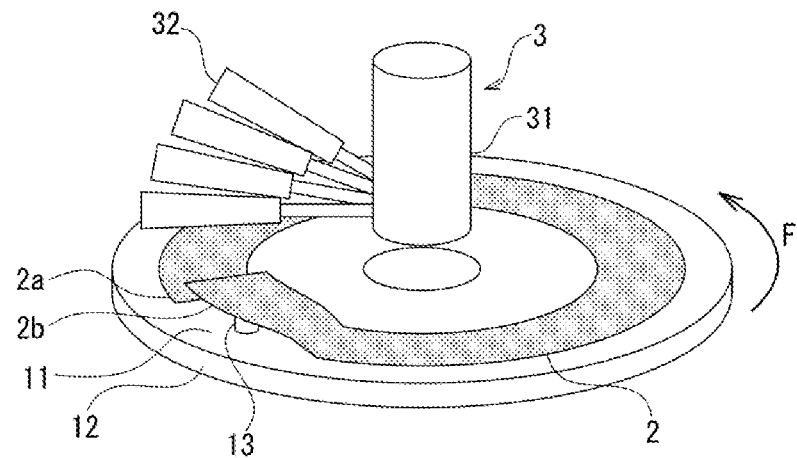

FIGS. 5A to 5C show the step of receiving a rubber member 2. First of all, a leading end portion 2a of the rubber member 2 supplied from the roller conveyor 3 serving as the supply device is mounted onto the mounting surface 11, as shown in FIG. 5A, and the rubber member 2 is wound up onto the mounting surface 11 of the rotary table 12 from the leading end portion 2a by forwardly rotating the rotary table 12 as shown in FIG. 5B. At this time, the leading end portion 2a of the rubber member 2 is mounted on a rear side in a rotating direction of the first suction pad 13 on the mounting surface 11, as shown in the drawing. As a result, since a rear end portion 2b of the rubber member 2 is positioned on the first suction pad 13 as shown in FIG. 5C, it is possible to receive the rubber member 2 from the supply device in a state in which the rear end portion 2b is sucked by the first suction pad 13 so as not in contact with the mounting surface 11.

After receiving the rubber member 2 from the roller conveyor 3, the rotary table 12 is moved from the receiving position in FIG. 2 to the transferring position in FIG. 3 by the moving mechanism 14.

Figure 6A:
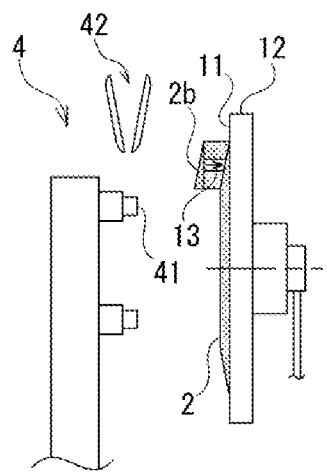
FIGS. 6A to 6F are views showing states in which the conveying device transfers the rubber member to a supply receiving device.

FIGS. 6A to 6F show the step of transferring the rubber member 2. As shown in FIG. 6A, the rear end portion 2b of the rubber member 2 received from the supply device comes to a state in which the rear end portion is not in contact with the mounting surface 11. At this time, the second suction pads 15 all suck the rubber member 2, and the rubber member 2 does not come away from the mounting surface 11.

Figure 6B:
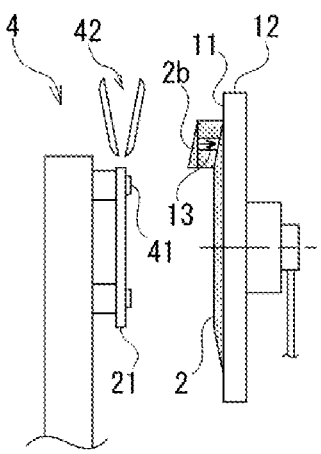

First of all, as shown in FIG. 6B, the bead wire 21 is set to the wire set rollers 41 of the molding machine 4, and the crimp stitcher 42 is moved down near the bead wire 21.

Figure 6C:
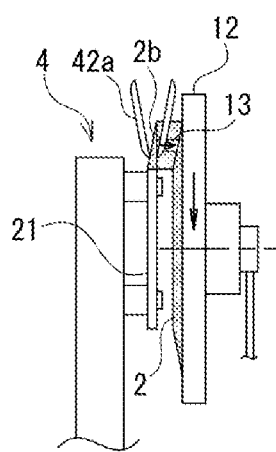

Next, as shown in FIG. 6C, the rear end portion 2b of the rubber member 2 is inserted between the pair of stitcher rollers 42a by moving the rotary table 12 to the transferring position and reversely rotating the rotary table 12 at a low speed. At this time, the bead wire 21 does not rotate. After the rear end portion 2b of the rubber member 2 is crimped onto the bead wire 21 by the stitcher rollers 42a of the crimp stitcher 42, the rotary table 12 is temporarily stopped, and the rear end portion 2b is released by cancelling the suction by the first suction pad 13. Thereafter, the first suction pad 13 is moved back and is accommodated in the rotary table 12.

Figure 6D:
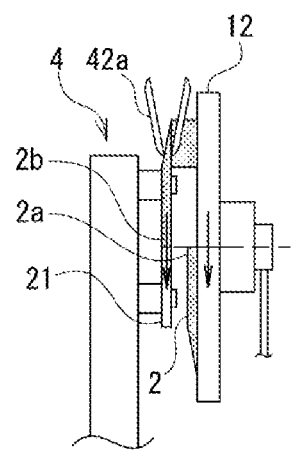
Figure 6E:
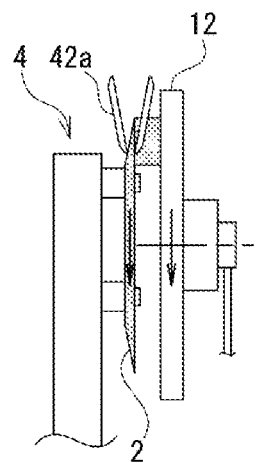

In the state where the first suction pad 13 is accommodated, the rubber member 2 is crimped onto the outer periphery of the bead wire 21 while being wound back from the rear end portion 2b as shown in FIGS. 6D and 6E, by rotating the rotary table 12 and the bead wire 21 in the same direction. At this time, the second suction pads 15 of the rotary table 12 cancel the suction sequentially in the order that the second suction pad 15 comes close to the stitcher roller 42a.

Figure 6F:
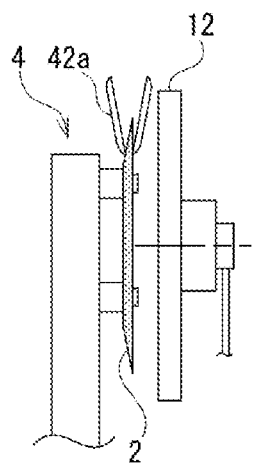

The step of transferring the rubber member 2 to the supply receiving device is finished by winding the rubber member 2 for 1 circle to the outer periphery of the bead wire 21, as shown in FIG. 6F. After the rubber member 2 is wound to the outer periphery of the bead wire 21, the crimp stitcher 42 is moved up. Thereafter, the end portions of the rubber member 2 are crimped and bonded by a crimp roller (not shown).

OTHER EMBODIMENTS (1) In the embodiment mentioned above, the roller conveyor 3 is shown as an example of the supply device, however, the supply device is not limited to this. For example, the curved rubber member 2 may be directly supplied by using an extruding device which can extrude the rubber member 2 in a curved state.

Figure 7:
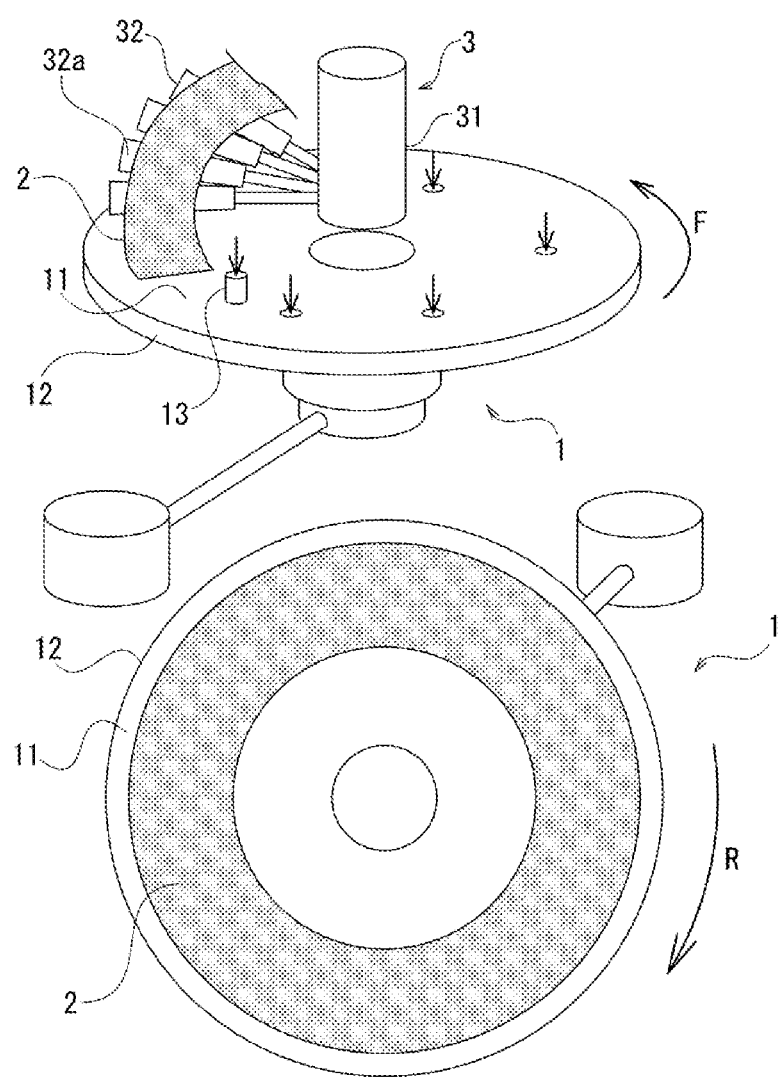
FIG. 7 is a perspective view showing a conveying device according to another embodiment.

(2) The rubber member may be alternately received from the supply device and the rubber member may be alternately transferred to the supply receiving device, by preparing 2 conveying devices according to the present invention in relation to one supply device and one supply receiving device, as shown in FIG. 7. As a result, it is possible to shorten a cycle time for conveying the rubber member.

What is claimed is:

1. A conveying method of a rubber member for receiving the rubber member which is supplied from a supply device and is curved, and transferring the received rubber member to a supply receiving device in a curved state, the method comprising the steps of:
    winding the rubber member from a leading end portion onto a mounting surface of a rotary table by forwardly rotating the rotary table and receiving the rubber member from the supply device in a state in which a rear end portion of the rubber member is not in contact with the mounting surface;
    moving the rotary table from a receiving position to a transferring position; and
    winding back the rubber member from the rear end portion so as to transfer the rubber member to the supply receiving device by reversely rotating the rotary table.

2. The conveying method of a rubber member according to claim 1, wherein in the receiving step, the rear end portion is made not in contact with the mounting surface by sucking the rear end portion by a first suction pad which outwardly protrudes out of the mounting surface, and
    in the transferring step, the rear end portion is released by cancelling the suction by the first suction pad.

3. The conveying method of a rubber member according to claim 2, wherein in the transferring step, the first suction pad is retracted and accommodated in the rotary table.

4. A conveying device of a rubber member for receiving the rubber member which is supplied from a supply device and is curved, and transferring the received rubber member to a supply receiving device in a curved state, the device comprising:
    a rotary table having a mounting surface on which the rubber member can be mounted;
    a first suction pad which can suck the rubber member by protruding outward from the mounting surface;
    a moving mechanism which can move the rotary table between a receiving position and a transferring position; and
    a control device controlling the first suction pad so as to receive the rubber member in a state in which a rear end portion of the rubber member is not in contact with the mounting surface by sucking the rear end portion of the rubber member by the first suction pad at the receiving position, and transfer the rubber member by cancelling the suction by the first suction pad so as to release the rear end portion at the transferring position.

5. The conveying device of a rubber member according to claim 4, wherein the first suction pad can be displaced between a protruding position at which the first suction pad protrudes out of the mounting surface, and a retraction position at which the first suction pad is retracted from the protruding position.

6. The conveying device of a rubber member according to claim 4, wherein the rotary table is provided with a second suction pad arranged at a position which is different in a circumferential direction from the first suction pad on the mounting surface.

* * * * *